United States Patent [19]
Kress

[11] Patent Number: 5,131,605
[45] Date of Patent: Jul. 21, 1992

[54] FOUR ENGINE VTOL AIRCRAFT

[75] Inventor: Robert W. Kress, Saugerties, N.Y.

[73] Assignee: Grumman Aerospace Corporation, Bethpage, N.Y.

[21] Appl. No.: 713,504

[22] Filed: Jun. 12, 1991

[51] Int. Cl.$^5$ .................... B64C 15/12; B64D 27/00
[52] U.S. Cl. ........................... 244/56; 244/55; 244/12.4; 244/12.5
[58] Field of Search ............. 244/56, 12.4, 23 D, 244/12.3, 55, 12.5, 23 R, 23 A; 60/228, 232

[56] References Cited

U.S. PATENT DOCUMENTS

| | | | |
|---|---|---|---|
| 2,971,725 | 2/1961 | Jakimiuk | 244/56 |
| 3,229,933 | 1/1966 | Kutney | 244/55 |
| 4,116,405 | 9/1978 | Bacchi et al. | 244/56 |
| 4,296,896 | 10/1981 | Kress et al. | 244/56 |
| 4,898,343 | 2/1990 | Kamo | 244/12.4 |

FOREIGN PATENT DOCUMENTS

| | | | |
|---|---|---|---|
| 1053322 | 3/1959 | Fed. Rep. of Germany | 244/12.4 |
| 1259107 | 1/1972 | United Kingdom | 244/12.4 |

*Primary Examiner*—Joseph F. Peters, Jr.
*Assistant Examiner*—Anne E. Bidwell
*Attorney, Agent, or Firm*—Richard G. Geib; Daniel J. Tick

[57] ABSTRACT

A VTOL aircraft has a first engine nacelle mounted under the wing on one side of the fuselage and houses two of the aircraft engines. The first engine nacelle is mounted in close proximity with the fuselage. A second engine nacelle is mounted under the wing on the opposite side of the fuselage from the first nacelle and houses the remaining two engines. The second engine nacelle is mounted in close proximity with the fuselage. The first and second nacelles are movable from positions parallel to the wing for normal flight to positions perpendicular to the wing for vertical flight. Each of the first and second engine nacelles has inlets and nozzles and each of the first and second nacelles is angled in a manner whereby its nozzles are closer to the fuselage than its inlets. First control vanes extend aft of the nozzles of, and are movable with, the first engine nacelle and second control vanes extend aft of the nozzles of, and are movable with, the second engine nacelle. Each of the first and second vanes include vertical vanes normally aligned with the thrust vector centerlines.

9 Claims, 5 Drawing Sheets

FIG. I

FOUR ENGINE VTOL AIRCRAFT

BACKGROUND OF THE INVENTION

The present invention relates to four engine VTOL aircraft.

A roll control problem arises in tilt fan VTOL aircraft when an engine fails. Military VTOL aircraft are required to maintain control in the event of sudden failure of an engine during takeoff or landing. They are required to maintain hover only at the considerably lighter landing condition. The Grumman 698 Tilt Fan design was able to meet military requirements with two engines with their fans cross-shafted to each other.

When there is an engine failure in a civil transport aircraft, where controlled hover must be maintained at the takeoff gross weight, twin engine designs with good payload/fuel loss are not possible. A four engine design is required where only one fourth of the installed power is lost upon engine failure as opposed to a one half power loss upon engine failure in twin engine aircraft. The added complexity of the extra two engines of a four engine aircraft is the penalty paid for a viable civil VTOL design. In a known four engine design, all four engines are moved laterally to achieve rolling moment balance. Although this system is mechanically feasible, it is likely to be heavy and considered complex. The four engine design can forego the complex and heavy cross-shaft of the twin engine design, however, if engine-failure roll control can be maintained.

The principal object of the invention is to provide a four engine VTOL aircraft having roll control upon failure of an engine.

An object of the invention is to provide a four engine VTOL aircraft having a roll control of simple structure which comes into operation upon failure of an engine.

Another object of the invention is to provide a four engine VTOL aircraft having efficient and reliable roll control effective upon failure of an engine.

Still another object of the invention is to provide a four engine VTOL aircraft having a roll control of simple structure which is built into the aircraft with facility and convenience and functions efficiently and reliably to control roll upon failure of an engine.

BRIEF SUMMARY OF THE INVENTION

In accordance with the invention, a VTOL aircraft having a fuselage and a wing on said fuselage comprises aircraft power means. A first engine nacelle is mounted under the wing in one side of the fuselage and housing part of the aircraft power means. The first engine nacelle is mounted in close proximity with the fuselage. A second engine nacelle is mounted under the wing on the opposite side of the fuselage from the first nacelle and houses an additional part of the aircraft power means. The second engine nacelle is mounted in close proximity with the fuselage. The first and second nacelles are movable from positions substantially parallel to the wing for normal flight to positions substantially perpendicular to the wing for vertical flight.

Each of the first and second engine nacelles has inlet means and nozzle means and each of the first and second nacelles is angled in a manner whereby its nozzle means is closer to the fuselage than its inlet means.

First control vane means extends aft of the nozzle means of and is movable with the first engine nacelle and second control vane means extends aft of the nozzle means of and is movable with the second engine nacelle.

Each of the first and second vane means includes vertical vane means normally aligned with the thrust vector centerlines.

Each of the first and second engine nacelles is essentially in contact with the fuselage.

The first and second nacelles are angled about 7 degrees.

The nozzle means of each of the first and second nacelles is canted outward.

In accordance with the invention, a VTOL aircraft having a fuselage and a fixed upper wing on said fuselage, comprises four aircraft engines. A first engine nacelle is mounted under the wing on one side of the fuselage and houses two of the aircraft engines, the first engine nacelle being mounted closely adjacent the fuselage. A second engine nacelle is mounted under the wing on the opposite side of the fuselage from the first nacelle and houses the remaining two of the aircraft engines, the second engine nacelle being mounted closely adjacent the fuselage. The first and second nacelles are movable from positions substantially parallel to the wing for normal flight to positions substantially perpendicular to the wing for vertical flight.

Each of the first and second engine nacelles has inlet means and nozzle means and each of the first and second nacelles is angled in a manner whereby its nozzle means is closer to the fuselage than its inlet means.

Each of the first and second engine nacelles has inlets for its two engines and nozzles for its two engines and each of the first and second nacelles is angled in a manner whereby its nozzles are closer to the fuselage than its inlets.

A first horizontal control vane and first vertical control vanes extend aft of the nozzles of and are movable with the first engine nacelle. A second horizontal control vane and second vertical control vanes extend aft of the nozzles of and are movable with the second engine nacelle. The first and second control vanes are normally aligned with the thrust vector centerlines of their corresponding engines.

Each of the first and second engine nacelles is essentially in contact with the fuselage.

The nozzles for the engines of each of the first and second nacelles are canted outward.

The first and second nacelles are angled about 7 degrees.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENT

Figure 1:
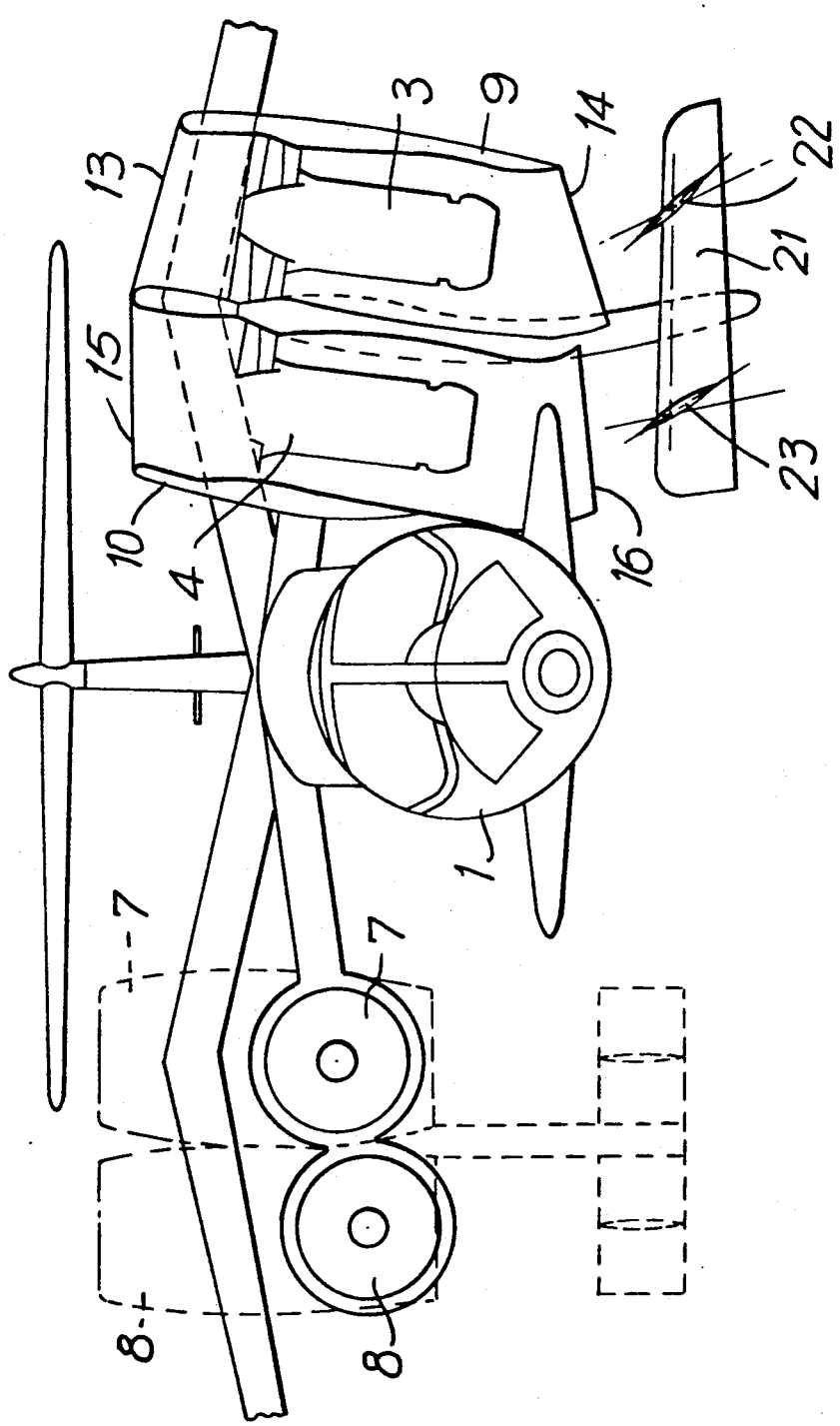
FIG. 1 is a front view of part of a VTOL aircraft illustrating a twin engine nacelle of the prior art in normal flight position on the left of the fuselage and an embodiment of a twin engine nacelle of the invention in VTOL position on the right of the fuselage.
Figure 2:
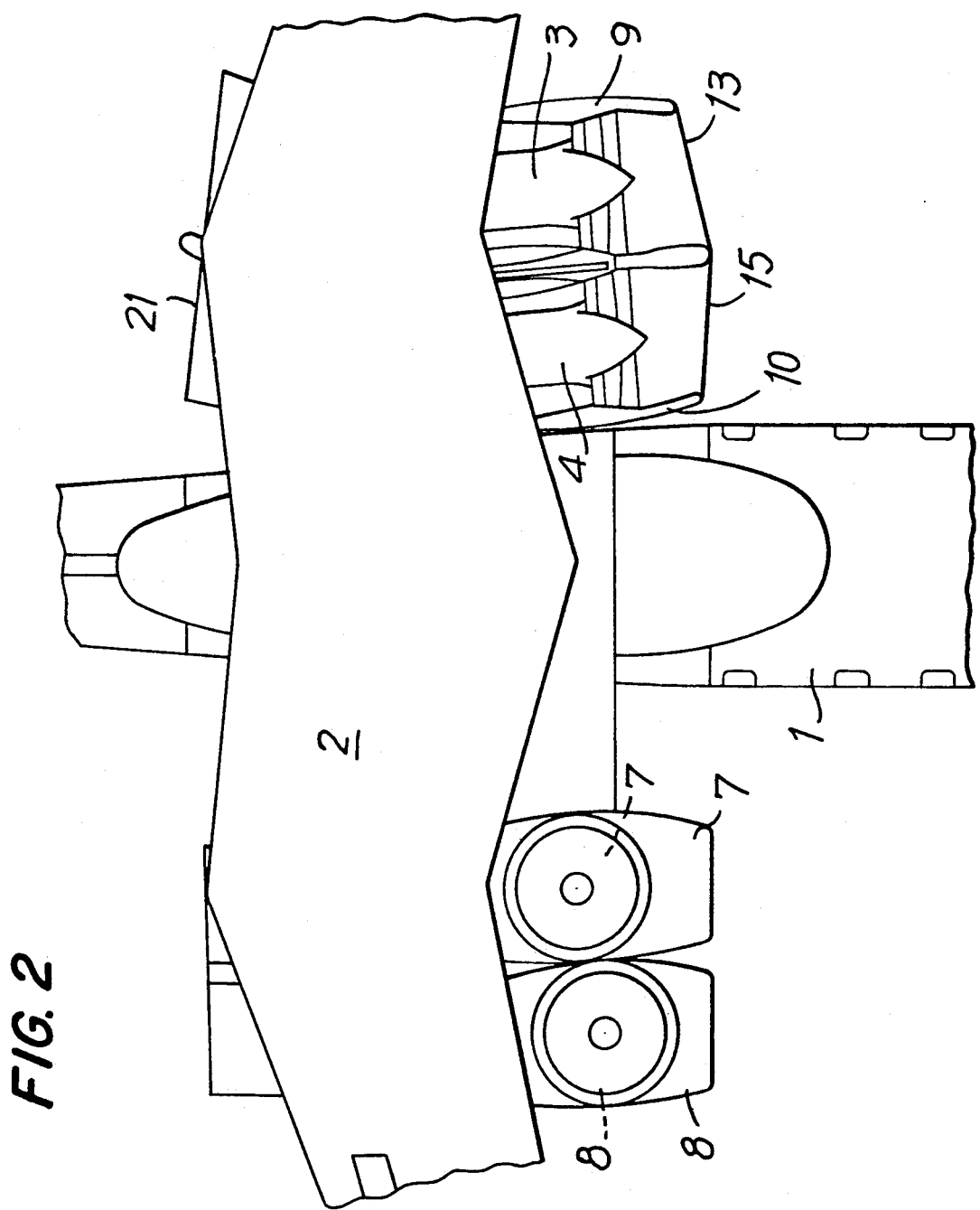
FIG. 2 is a top plan of the wing and engine nacelles of FIG. 1.
Figure 3A:
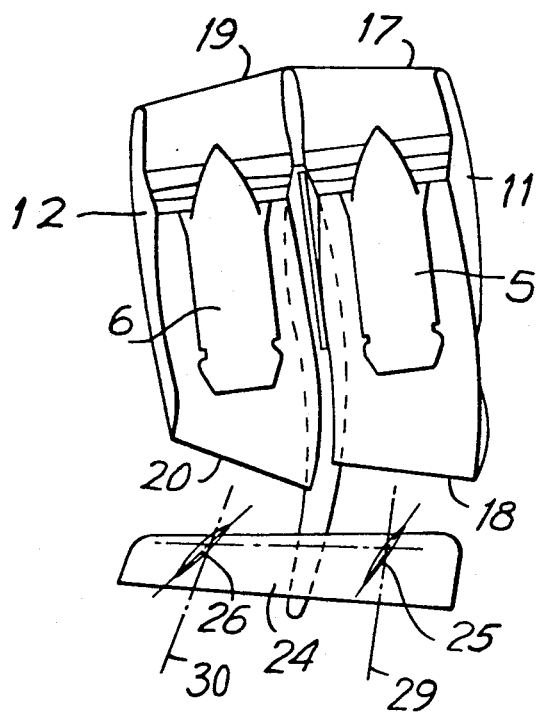
FIG. 3A is a front view of the embodiment of FIG. 1 of the invention on the left of the fuselage.
Figure 3B:
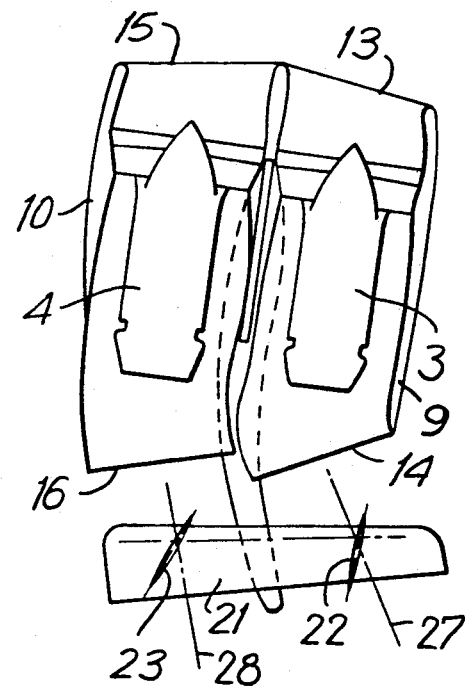
FIG. 3B is a front view of the embodiment of FIG. 1 of the invention on the right of the fuselage.
Figure 4:
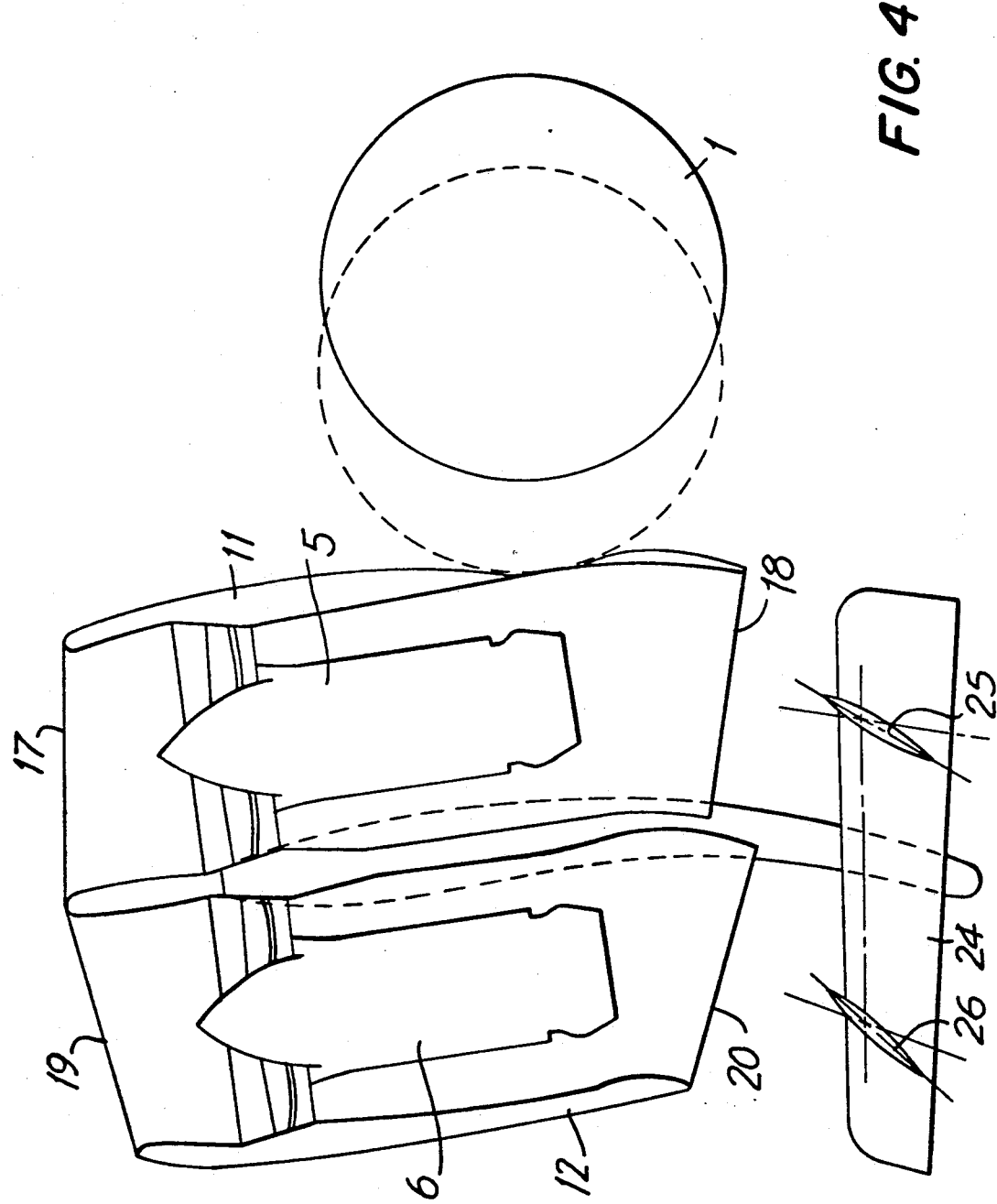
FIG. 4 is a front view, on an enlarged scale, of the embodiment of FIG. 1 of the invention on the left of the fuselage with the vanes extended for failure of an engine on the right of the fuselage.

The four engine VTOL aircraft of the invention has a fuselage 1, a fixed upper wing 2 on said fuselage (FIGS. 1 and 2) and four aircraft engines 3,4, shown in FIGS. 1,2 and 3B, 5 and 6, shown in FIGS. 3A and 4.

The invention is clearly described in FIGS. 1 and 2 which show the known system on the left side of the fuselage 1 and the system of the invention on the right side of said fuselage. Thus, as shown in FIGS. 1 and 2, the engines 7 and 8 of the known system are moved inboard as far as possible in the system of the invention, so that the engines 3 and 4 are closely adjacent the fuselage 1 (FIGS. 1 and 2) and are angled, as hereinafter explained.

The placing of the engines 3,4,5 and 6 close inboard, or closely adjacent the fuselage 1 minimizes the applied rolling moment in case of an engine failure. A first engine nacelle 9, 10 is mounted under the wing 2 on the right side of the fuselage 1 and houses the aircraft engines 3 and 4, as shown in FIGS. 1, 2 and 3B. The first engine nacelle 9, 10 is mounted closely adjacent the fuselage 1 (FIGS. 1 and 2). A second engine nacelle 11, 12 is mounted under the wing 2 on the left side of the fuselage 1 and houses the aircraft engines 5 and 6, as shown in FIGS. 3A and 4. The second engine nacelle 11, 12 is mounted closely adjacent the fuselage 1.

The first and second nacelles 9, 10 and 11, 12 are movable from positions substantially parallel to the wing 2 (FIG. 2), in the manner of VTOLs, for normal, or level, or forward flight, to positions substantially perpendicular to said wing (FIG. 1), in the manner of VTOLs, for vertical, or hovering flight.

The first engine nacelle 9, 10 has an inlet 13 (FIGS. 1, 2 and 3B) and a nozzle 14 for its engine 3 (FIGS. 1 and 3B). The first engine nacelle 9, 10 has an inlet 15 (FIGS. 1, 2 and 3B) and a nozzle 16 for its engine 4 (FIGS. 1 and 3B). The first nacelle 9, 10 is angled in a manner whereby its nozzles 14 and 16 are closer to the fuselage 1 than its inlets 13 and 15, as shown in FIGS. 1 and 2. The second engine nacelle 11, 12 has an inlet 17 and a nozzle 18 for its engine 5 (FIGS. 3A and 4). The second engine nacelle 11, 12 has an inlet 19 and a nozzle 20 for its engine 6 (FIGS. 3A and 4). The second nacelle 11, 12 is angled in a manner whereby its nozzles 18 and 20 are closer to the fuselage than its inlets 17 and 19.

A first horizontal control vane 21 and first vertical control vanes 22 and 23 extend aft of the nozzles of, and are movable with, the first engine nacelle 9, 10 (FIGS. 1, 2 and 3B). A second horizontal control vane 24 and second vertical control vanes 25 and 26 extend aft of the nozzles of, and are movable with, the second engine nacelle 11, 12 (FIGS. 3A and 4). The first and second vertical control vanes 22 and 23, and 25 and 26, respectively, are normally aligned with the thrust vector centerlines 27 and 28, and 29 and 30, respectively, of their corresponding engines 3, 4, 5 and 6 (FIGS. 3A and 3B).

Although right and left of an aircraft are usually those of the pilot in the cockpit, these are revised herein, since the front views are of the viewer facing the aircraft. Thus, the engine nacelle shown to the right of the fuselage 1 is defined herein as being on the right side of said fuselage, since that is how a viewer of the FIGS. sees them.

FIG. 1 illustrates the operation of the vertical vanes 22 and 23 in the turbofan exhausts for producing roll control. In FIG. 1, the vertical vanes 22 and 23 are shown deflected for maximum roll control to the left from the right engine nacelle 9, 10. Normally, the vertical vanes would be aligned with the thrust vector centerlines shown at their locations.

FIGS. 3A and 3B are front views of the dual engine nacelles 9, 10 and 11, 12. All the control vanes are deflected to produce a rolling moment to the left such as to counter an engine failure applied moment.

FIG. 4 illustrates the engine nacelles moved inboard such that they nearly touch the fuselage 1 with said nacelles vertical. This minimizes the applied rolling moment due to engine failure, in accordance with the invention. The engine nacelles are angled inward about 7 degrees. This places the jet nozzles slightly further inboard than the main part of the engines. Statically, jet thrust is applied at the nozzle, so that the farther inboard nozzle location further reduces the engine failed applied moment with respect to the lateral placement feature. The nozzles for the engines are canted outward, the outboard engine more so, since it is more critical in the case of engine failure, being further from the aircraft center. By canting the nozzles outward, the thrust lines of the live engines all pass closer to the aircraft center of gravity. The limiting factor in the amount of engine thrust line cant is cosine law loss of hover thrust with the nacelles vertical. Similar losses occur in cruise thrust with the nacelles level. Fortunately, the losses are the average of the inboard and outboard nacelle values, which allows quite a bit of nacelle deflection to be used.

Figure 5:
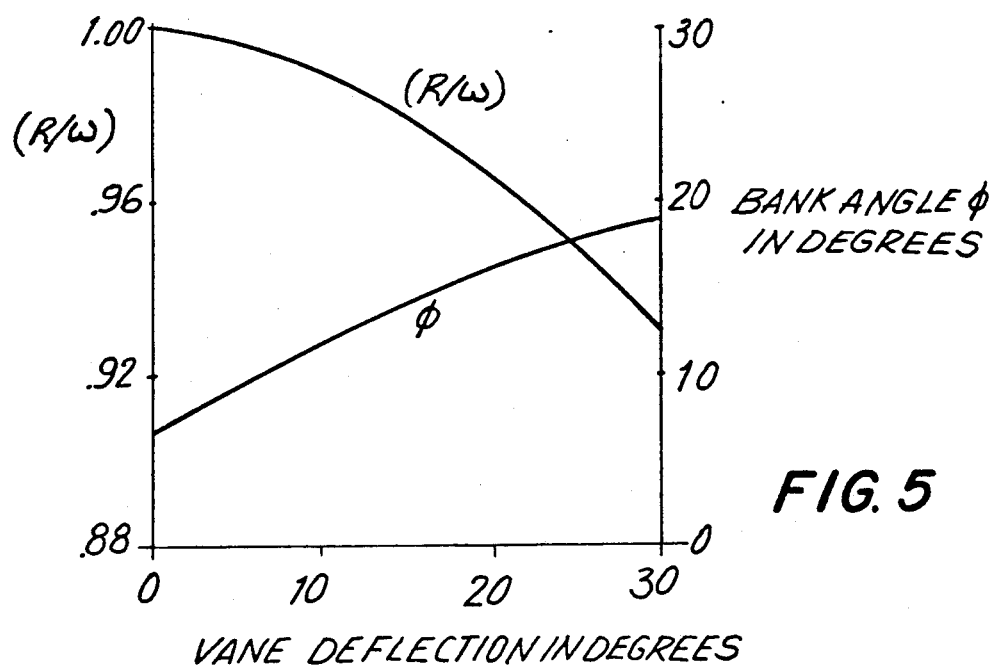
FIG. 5 is a graphical presentation showing the force-to-weight ratio relative to vane deflections and bank angle.
Figure 6:
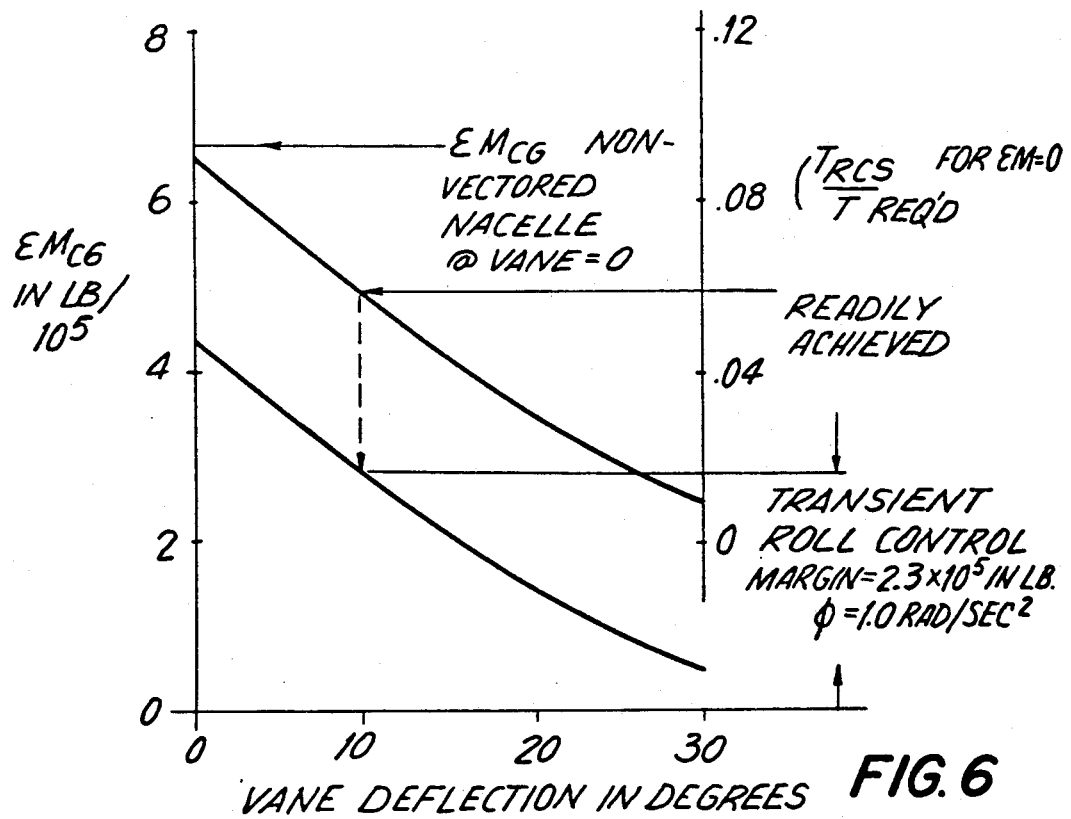
FIG. 6 is a graphical presentation showing the amount of roll reaction control jet system thrust required to balance the aircraft as a function of vane deflection.

FIGS. 5 and 6 are graphical presentations quantifying results for a typical business jet design. In FIG. 5, the abscissa indicates the vertical vane deflection in degrees, the left side ordinate indicates the force-to-weight ratio R/W in radians and the right side ordinate indicates the bank angle $\phi$ in degrees. In FIG. 6, the abscissa indicates the vertical vane deflection in degrees, the left side ordinate indicates the summation of roll moments ($\Sigma M_{CG}$) about the center of gravity and the right side ordinate indicates reaction control thrust as a percent of vertical thrust required to maintain roll equilibrium ($\Sigma M = 0$) at the roll moment unbalanced levels of the left-hand scale.

FIG. 6 shows the applied rolling moment due to engine failure. When there is no counteracting vane input, the value is 433,000 in. lb. For comparison, the same value for a non-vectored nacelle has been calculated to be 667,000 in. lb. The application of the vertical vanes to counter the roll can almost achieve balance, for the 433,000 in. lb. vectored nacelle case.

However, reference to FIG. 5 shows that the hovering resultant vertical force-to-weight ratio R/W deteriorates rapidly with required vane deflections approaching 30 degrees, the maximum available. Also, the bank angle $\phi$ for straight flight becomes excessively large.

The solution comes in the form of an engine bleed air driven wing tip roll reaction control jet system RCS. FIG. 6 shows the amount of RCS thrust required to balance the aircraft as a function of vane deflection. The parameter is the ratio of RCS bleed thrust to engine thrust for the three engines remaining. It is seen that achievable levels of RCS thrust reduce the required trim vane deflections to roughly 10 degrees. At this level of vane deflection, the vertical resultant force loss is confined to 1% and the bank angle to 11.5 degrees.

Another advantage of the invention is that vertical vane deflection is available for transient maneuvers, once engine failed trim has been achieved. This is very important to cover pilot delays and errors in the event of a sudden engine failure. The excess roll control available can produce a roll acceleration of roughly 1 rad./sec. squared. The magnitude of this transient roll control margin is almost identical to the incremental reduction of engine failure applied rolling moment resulting from the dual vectored nacelle configuration of the invention. That is, in the aircraft of the invention, not only is roll trim achieved at moderate trim vane angles with acceptable R/W and bank angle values, but a large excess of vane angle becomes available for transient control.

Although shown and described in what is believed to be the most practical and preferred embodiment, it is apparent that departures from the specific method and design described and shown will suggest themselves to those skilled in the art and may be made without departing from the spirit and scope of the invention. I, therefore, do not wish to restrict myself to the particular construction described and illustrated, but desire to avail myself of all modifications that may fall within the scope of the appended claims.

I claim:

1. A VTOL aircraft having a fuselage and a wing on said fuselage, said aircraft comprising
   aircraft power means;
   a first engine nacelle mounted under said wing on one side of said fuselage and housing part of said aircraft power means, said first engine nacelle being mounted in close proximity with said fuselage; and
   a second engine nacelle mounted under said wing on the opposite side of said fuselage from said first nacelle and housing an additional part of said aircraft power means, said second engine nacelle being mounted in close proximity with said fuselage, said first and second nacelles being movable from positions substantially parallel to said wing for normal flight to positions substantially perpendicular to said wing for vertical flight, each of said first and second engine nacelles having inlet means and nozzle means and each of said first and second nacelles being angled in a manner whereby its nozzle means is closer to said fuselage than its inlet means, the nozzle means of each of said 2. A VTOL aircraft as claimed in claim 1, further comprising first control vane means extending aft of the nozzle means of and movable with said first engine nacelle and second control vane means extending aft of the nozzle means of and movable with said second engine nacelle, each of said first and second vane means including vertical vane means normally aligned with the thrust vector centerlines.

3. A VTOL aircraft as claimed in claim 1, wherein each of said first and second engine nacelles is essentially in contact with said fuselage.

4. A VTOL aircraft as claimed in claim 1, wherein said first and second nacelles are angled about 7 degrees.

5. A VTOL aircraft having a fuselage and a fixed upper wing on said fuselage, said aircraft comprising
   four aircraft engines;
   a first engine nacelle mounted under said wing on one side of said fuselage and housing two of said aircraft engines, said first engine nacelle being mounted closely adjacent said fuselage; and
   a second engine nacelle mounted under said wing on the opposite side of said fuselage from said first nacelle and housing the remaining two of said aircraft engines, said second engine nacelle being mounted closely adjacent said fuselage, said first and second nacelles being movable from positions substantially parallel to said wing for normal flight positions substantially perpendicular to said wing for vertical flight, each of said first and second engine nacelles having inlet means and nozzle means and each of said first and second nacelles being angled in a manner whereby its nozzle means is closer to said fuselage than its inlet means, the nozzles for the engines of each of said first and second nacelles being canted outward from said fuselage 6. A VTOL aircraft as claimed in claim 5 wherein each of said first and second engine nacelles has inlets for its two engines and nozzles for its two engines and each of said first and second nacelles is angled in a manner whereby its nozzles are closer to said fuselage than its inlets.

7. A VTOL aircraft as claimed in claim 5, further comprising a first horizontal control vane and first vertical control vanes extending aft of the nozzle means of and movable with said first engine nacelle and a second horizontal control vane and second vertical control vanes extending aft of the nozzle means of and movable with said second engine nacelle, said first and second vertical control vanes being normally aligned with the thrust vector centerlines of their corresponding engines.

8. A VTOL aircraft as claimed in claim 5, wherein each of said first and second engine nacelles is essentially in contact with said fuselage.

9. A VTOL aircraft as claimed in claim 5, wherein said first and second nacelles are angled about 7 degrees.

* * * * *